United States Patent
Liu et al.

(10) Patent No.: US 11,250,588 B2
(45) Date of Patent: Feb. 15, 2022

(54) METHOD AND APPARATUS FOR FILTERING GLINTS

(71) Applicant: BEIJING 7INVENSUN TECHNOLOGY CO., LTD., Beijing (CN)

(72) Inventors: Wei Liu, Beijing (CN); Dongchun Ren, Beijing (CN); Xiaohu Gong, Beijing (CN); Meng Yang, Beijing (CN); Fengmei Nie, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/347,821

(22) PCT Filed: Dec. 7, 2018

(86) PCT No.: PCT/CN2018/119880
§ 371 (c)(1),
(2) Date: May 7, 2019

(87) PCT Pub. No.: WO2019/128676
PCT Pub. Date: Jul. 4, 2019

(65) Prior Publication Data
US 2021/0287396 A1    Sep. 16, 2021

(30) Foreign Application Priority Data
Dec. 27, 2017  (CN) .......................... 201711455781.3

(51) Int. Cl.
G06K 9/00    (2006.01)
G06T 7/73    (2017.01)
(Continued)

(52) U.S. Cl.
CPC ............ G06T 7/74 (2017.01); G06F 3/013 (2013.01); G06N 20/00 (2019.01); G06T 7/0002 (2013.01);
(Continued)

(58) Field of Classification Search
CPC ............... G06T 7/74; G06T 7/0002; G06T 2207/30201; G06T 2207/30168; G06N 20/00; G06F 3/013
(Continued)

(56) References Cited

U.S. PATENT DOCUMENTS

2013/0050476 A1    2/2013    Shi et al.

FOREIGN PATENT DOCUMENTS

| CN | 102999230 A | 3/2013 |
| CN | 103544420 A | 1/2014 |

(Continued)

OTHER PUBLICATIONS m0_37598482: "Feature point matching and elimination of mismatched points". CSDN. Nov. 28, 2017 (Nov. 28, 2017). https://blog.csdn.net/m0_37598482/article/details/78654522. pp. 1-7.
(Continued)

*Primary Examiner* — Stephen P Coleman
(74) *Attorney, Agent, or Firm* — Gang Yu (57) ABSTRACT

The present disclosure discloses a method and apparatus for filtering glints. The method includes that: a first image and a reference image matched with the first image are acquired, and first-type glints are displayed in the first image; second-type glints in the first image are determined according to the reference image, and the second-type glints are glints obtained by estimating glints in the first image on the basis of the reference image; a matching result of the first-type glints and the second-type glints is determined according to first positions of the first-type glints and second positions of
(Continued)

the second-type glints; and the first-type glints are filtered according to the matching result.

19 Claims, 2 Drawing Sheets

(51) Int. Cl.
*G06N 20/00* (2019.01)
*G06F 3/01* (2006.01)
*G06T 7/00* (2017.01)

(52) U.S. Cl.
CPC .............. *G06T 2207/30168* (2013.01); *G06T 2207/30201* (2013.01)

(58) Field of Classification Search
USPC ........................................................ 382/103
See application file for complete search history.

(56) References Cited

FOREIGN PATENT DOCUMENTS

| CN | 104182938 A | 12/2014 |
|----|-------------|---------|
| CN | 104732191 A | 6/2015  |
| CN | 105844712 A | 8/2016  |
| CN | 108257112 A | 7/2018  |

OTHER PUBLICATIONS

Zhang, Gesen et al. "A rapid matching algorithm via image local feature". Computer Technology and Its Applications. Nov. 30, 2015 (Nov. 30, 2015). vol. 41, No. 11. pp. 124-127.

METHOD AND APPARATUS FOR FILTERING GLINTS

TECHNICAL FIELD

The present disclosure relates to the field of eye-tracking, and in particular to a method and apparatus for filtering glints.

BACKGROUND

A Virtual Reality (VR) technology is a computer technology capable of creating and experiencing a virtual world, and is extensively applied to the field of eye-tracking.

During a practical application, a VR apparatus may perform gaze estimation on a remote apparatus of a gaze point according to a pupil center coordinate and cornea reflection in a Three-Dimensional (3D) approximately spherical model of an eyeball. If the VR apparatus uses multiple cameras and multiple at least one light source, a gaze may be estimated by single-point calibration. However, because of different relative positions of the multiple at least one light source and the multiple cameras, part of the multiple cameras at some positions may not capture images or may capture poor images, interference glints or false glints may not be effectively filtered, and the glints may further not be accurately matched with the at least one light source.

For a problem of incapability in accurately filtering false glints in a related art, no effective solution has been provided yet.

SUMMARY

At least some embodiments of the present disclosure provide a method and apparatus for filtering glints, so as at least partially to solve a technical problem of incapability in accurately filtering false glints in the related art.

In one embodiment of the present disclosure, a method for filtering glints is provided, which includes that: a first image and a reference image matched with the first image are acquired, and first-type glints are displayed in the first image; second-type glints in the first image are determined according to the reference image, and the second-type glints are glints obtained by estimating glints in the first image on the basis of the reference image; a matching result of the first-type glints and the second-type glints is determined according to first positions of the first-type glints and second positions of the second-type glints; and the first-type glints are filtered according to the matching result.

In another embodiment of the present disclosure, an apparatus for filtering glints is also provided, which includes: an acquisition component, configured to acquire a first image and a reference image matched with the first image, and first-type glints are displayed in the first image; a first determination component, configured to determine second-type glints in the first image according to the reference image, and the second-type glints are glints obtained by estimating glints in the first image on the basis of the reference image; a second determination component, configured to determine a matching result of the first-type glints and the second-type glints according to first positions of the first-type glints and second positions of the second-type glints; and a filtering component, configured to filter the first-type glints according to the matching result.

In another embodiment of the present disclosure, a storage medium is also provided, which includes a stored program, the stored program executes the method for filtering glints.

In another embodiment of the present disclosure, a processor is also provided, which is configured to run a program, the program running to execute the method for filtering glints.

In another embodiment of the present disclosure, an eye-tracking device is also provided, which includes the apparatus for filtering glints.

Through the at least some embodiments of the present disclosure, an image matching manner is adopted, the first image and the reference image matched with the first image are acquired, the second-type glints in the first image are determined according to the reference image, the matching result of the first-type glints and the second-type glints is determined according to the first positions of the first-type glints and the second-positions of the second-type glints, and the first-type glints are finally filtered according to the matching result, the first-type glints being displayed in the first image and the second-type glints being the glints obtained by estimating the glints in the first image on the basis of the reference image. Therefore, a purpose of accurately filtering false glints is achieved, a technical effect of accurately matching at least one light source and the glints is achieved, and the technical problem of incapability in accurately filtering the false glints in the related art is further solved.

BRIEF DESCRIPTION OF THE DRAWINGS

The drawings described here are adopted to provide a further understanding to the present disclosure and form a part of the present disclosure. Schematic embodiments of the present disclosure and descriptions thereof are adopted to explain the present disclosure and not intended to form improper limits to the present disclosure. In the drawings.

DETAILED DESCRIPTION

In order to make those skilled in the art understand the solutions of the present disclosure better, the technical solutions in the embodiments of the present disclosure will be clearly and completely described below in combination with the drawings in the embodiments of the present disclosure. It is apparent that the described embodiments are not all embodiments but only a part of the embodiments of the present disclosure. All other embodiments obtained by those of ordinary skill in the art on the basis of the embodiments in the present disclosure without creative work shall fall within the scope of protection of the present disclosure.

It is to be noted that terms "first", "second" and the like in the specification, claims and drawings of the present disclosure are adopted not to describe a specific sequence or order but to distinguish similar objects. It should be understood that data used like this may be exchanged under a proper condition for implementation of the embodiments of the present disclosure described here At step Sequences besides those shown or described herein. In addition, terms "include" and "have" and any transformation thereof are intended to cover nonexclusive inclusions. For example, a process, method, system, product or device including a series of steps or elements is not limited to those clearly listed steps or elements, but may include other steps or elements which are not clearly listed or inherent in the process, the method, the system, the product or the device.

Embodiment One

In this embodiment of the present disclosure, a method for filtering glints embodiment is provided. It is to be noted that the steps shown in the flowchart of the drawings may be executed in a computer system like a set of computer executable instructions, and moreover, although a logic sequence is shown in the flowchart, the shown or described steps may be executed in a sequence different from that described here under some conditions.

Figure 1:
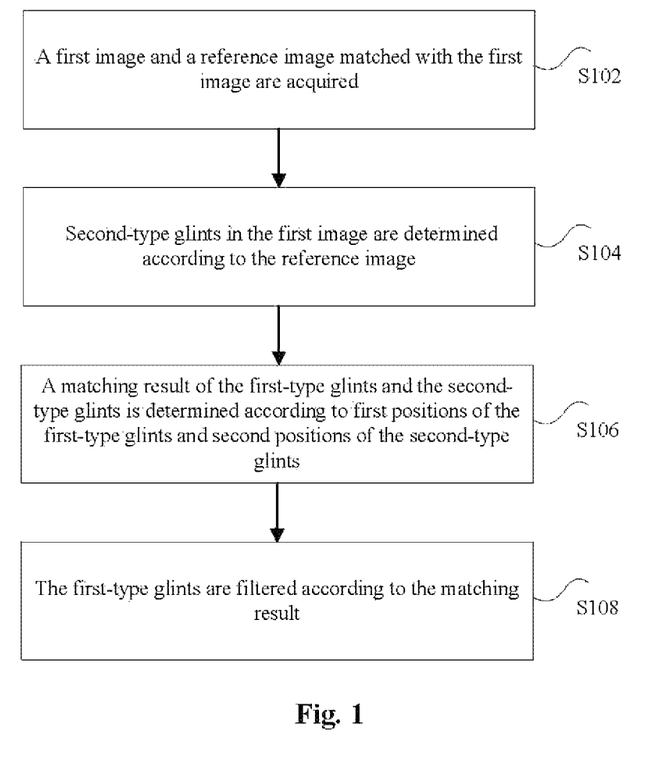
FIG. 1 is a flowchart of a method for filtering glints according to an embodiment of the present disclosure.

FIG. 1 is a flowchart of a method for filtering glints according to an embodiment of the present disclosure. As shown in FIG. 1, the method includes the following steps.

At step S102, a first image and a reference image matched with the first image are acquired, and first-type glints are displayed in the first image.

It is to be noted that the first image is an image acquired by a camera and the first image includes at least one human eye. The first image includes the first-type glints. Herein, the first-type glints not only include glints corresponding to at least one light source, i.e., glints obtained by projecting the at least one light source on the camera in a cornea reflection manner, but also include false glints. The false glints are abnormal glints, and are required to be filtered. The reference image refers to an image matched with the first image. Herein, the reference image also includes the at least one human eye and the glints corresponding to the at least one light source. The reference image does not include false glints.

Optionally, an executed object of the method in all the embodiments in the present disclosure is an eye-tracking device. The eye-tracking device may be, but not limited to, a VR device and an intelligent terminal with an eye-tracking function, for example, a mobile phone, a computer or a wearable device.

Figure 2:
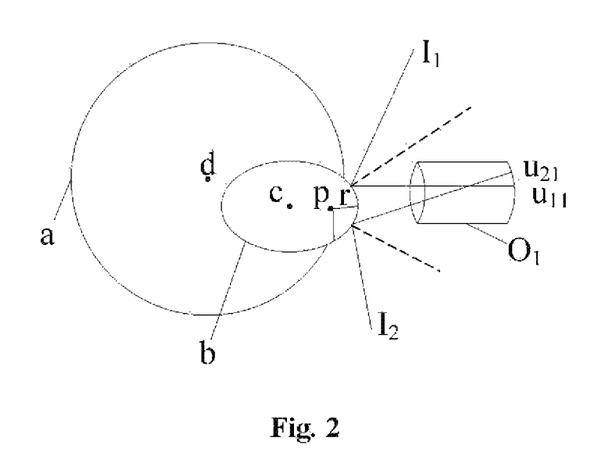
FIG. 2 is a structural schematic diagram of an eye-tracking apparatus according to an optional embodiment of the present disclosure.

Specifically, FIG. 2 is a structural schematic diagram of an eye-tracking device according to an optional embodiment of the present disclosure. As shown in FIG. 2, a is an eyeball, b is a cornea surface, c is a cornea curvature center, d is an eyeball rotating center, p is a pupil center, r is a pupil radius, $O_1$ is a camera, $I_1$ and $I_2$ are two light sources, and $u_{21}$ and $u_{11}$ are imaging points of the two light sources on the camera after cornea reflection. The imaging points of the two light sources on the camera after cornea reflection are the glints. Therefore, the eye-tracking device may acquire the first image shot by the camera, and the reference image may be extracted from multiple images acquired at different initial positions and different viewing angles by a bilinear model training method introduced in the article "Separating style and content with bilinear models". The reference image is an image best matched with the first image.

At step S104, second-type glints in the first image are determined according to the reference image, and the second-type glints are glints obtained by estimating the glints in the first image on the basis of the reference image.

It is to be noted that, since glints in the reference image are the glints corresponding to the at least one light source and the reference image is best matched with the first image, the second-type glints in the first image may be roughly determined by taking the reference image as a reference. The second-type glints in the first image represent the glints corresponding to the at least one light source. Therefore, false glints in the first-type glints may be filtered according to the second-type glints.

Specifically, relative positions of the glints in the first image and a pupil may be determined according to relative positions of the glints in the reference image and the pupil. Since a position of the pupil may be accurately obtained through a related image processing algorithm, the position of the pupil in the first image and the position of the pupil in the reference image may be matched, and positions of the second-type glints in the first image may be roughly determined according to the glints in the reference image.

At step S106, a matching result of the first-type glints and the second-type glints is determined according to first positions of the first-type glints and second positions of the second-type glints.

It is to be noted that, after the positions of the first-type glints and the second-type glints are acquired, a distance weight value between the position of each glint in the first-type glints and the position of each glint in the second-type glints may be determined according to a distance between the position of each glint in the first-type glints and the position of each glint in the second-type glints. And after the distance weight value between the first position of each first-type glint and the second position of each second-type glint is obtained, the first-type glints and the second-type glints are matched by use of a matching algorithm.

In addition, it is also to be noted that the first-type glints and the second-type glints are matched by use of a Kuhn-Munkras (KM) algorithm (i.e., optimal bipartite matching algorithm) introduced in the book "Matching Theory".

At step S108, the first-type glints are filtered according to the matching result.

It is to be noted that, after the matching result of the first-type glints and the second-type glints is acquired, a certain matched glint in the first-type glints form vectors with the other glints in the first-type glints. Meanwhile, a glint, corresponding to the certain matched glint, in the second-type glints also forms vectors with the other glints in the second-type glints, and whether or not the certain matched glint in the first-type glints is an abnormal glint is determined according to included angles between each two corresponding vectors. For example, the first-type glints include five glints, i.e., A, B, C, D and E respectively. The glints, corresponding to glints A, C and E in the first-type glints, in the second-type glints are A', C' and E'. A forms a vector $\overrightarrow{AC}$ with C and forms a vector $\overrightarrow{AE}$ with E respectively. A' forms a vector $\overrightarrow{A'C'}$ with C' and forms a vector $\overrightarrow{A'E'}$ with E' respectively. An included angle between the vector $\overrightarrow{AC}$ and the vector $\overrightarrow{A'C'}$ is θ. An included angle between the vector $\overrightarrow{AE}$ and the vector $\overrightarrow{A'E'}$ is δ. Each of θ and δ is compared with a preset vector angle to determine the number of abnormal vector angles of the glint A, and whether or not the glint A is the abnormal glint is further determined according to the number of abnormal vectors of the glint A. If the glint A is the abnormal glint, the glint A is filtered. Herein, if θ is larger than the preset vector angle, the vector $\overrightarrow{AC}$ is determined to be an abnormal vector; and similarly, if δ is larger than the preset vector angle, the vector $\overrightarrow{AE}$ is determined to be the abnormal vector.

On the basis of the solution defined by step S102 to step S108, it can be seen that the first image and the reference image are acquired, the second-type glints in the first image are determined according to the reference image, the distance weight values between the first-type glints and the second-type glints are determined according to the first positions of the first-type glints and the second positions of the second-type glints, the first-type glints and the second-type glints are matched to obtain the matching result according to the distance weight values, and the first-type glints are finally filtered according to the matching result, the first-type glints being displayed in the first image and the second-type glints being the glints obtained by estimating the glints in the first image on the basis of the reference image.

It is apparent that, since a method for determining the second positions of the second-type glints in the first image by use of the reference image is simple and determination accuracy of positions of the second-type glints is relatively high, filtering accuracy of false glints may further be improved. In addition, after the positions of the second-type glints are determined, positions of normal glints in the first-type glints in the first image, i.e., the glints corresponding to the at least one light source, are roughly determined, then the matching result of the first-type glints and the second-type glints is determined according to the distance weight values between the first-type glints and the second-type glints, and the false glints in the first-type glints are further eliminated according to the matching result. From the above, it can be seen that this process is equivalent to that the false glints are filtered twice, thereby further achieving a purpose of accurately filtering the false glints.

From the above, it can be seen that, according to the embodiment, the purpose of accurately filtering the false glints may be achieved, so that a technical effect of accurately matching the glints of the at least one light source is achieved, and the technical problem of incapability in accurately filtering the false glints in the related art is further solved.

In an optional embodiment, the reference image may be acquired through the following steps.

At step S1022, a bilinear model is constructed.

At step S1024, the first image is input into the bilinear model.

At step S1026, output data of the bilinear model is determined.

At step S1028, the reference image is determined according to the output data.

Specifically, the bilinear model may be constructed through an image training method. After the bilinear model is obtained, the first image may be taken as input of the bilinear model. After receiving the first image, an analysis processing is performed on the first image through the bilinear model to find an image best matched with the first image, so as to output this image. The output image of the bilinear model is the reference image matched with the first image.

It is to be noted that a method for constructing the bilinear model through the image training method specifically includes the following steps.

At step S1022a, multiple images are collected, and each image in the multiple images includes glints corresponding to at least one light source.

At step S1022b, parameter information of each image is acquired, and the parameter information includes at least one of starting positions of the glints in each image and a shooting viewing angle of each image.

At step S1022c, the bilinear model is obtained according to the parameter information of each image and relative positions of the glints and the pupil in each image.

It is to be noted that each image in the multiple images may be collected at different shooting viewing angles, thereby ensuring that the relative positions, determined under different shooting viewing angles, of the glints and the pupil for the same cornea are accurate. Therefore, the bilinear model, after receiving the first image, may determine the reference image best matched with the first image according to parameter information of the first image.

In addition, it is also to be noted that, after the bilinear model is constructed, the first image is input into the bilinear model, the reference image output by the bilinear mode is acquired, and the eye-tracking device may determine the second-type glints in the first image according to the reference image, specifically including the following steps.

At step S1040, a relative position of each glint and the pupil in the reference image is acquired.

At step S1042, a position of the pupil in the first image is acquired.

At step S1044, the positions of the second-type glints are determined according to the position of the pupil in the first image and the relative position of each glint and pupil in the reference image.

Specifically, the eye-tracking device may determine the relative positions of the glints and the pupil in the reference image and may also obtain the position of the pupil in the first image. The relative positions of the glints and the pupil in the reference image are the same as the relative positions of the second-type glints and the pupil in the first image. Therefore, the positions of the second-type glints may be determined according to the relative positions of the glints and the pupil in the reference image and the position of the pupil in the first image. For example, if a relative position of the glint A' and the pupil in the reference image is (30, 40) and a position coordinate of the pupil in the first image is (500, 500), a position coordinate of the second-type glint A, matched with the glint A' in the reference image, in the first image is (530, 540).

It is to be noted that, during a practical application, the number of the glints corresponding to the at least one light source in the first image and the positions of the glints are indeterminate, so that, for determining the second-type glints in the first image more effectively, it is necessary to match the first-type glints and second-type glints in the first image through a graphical model method and then remove the abnormal glints (i.e., the false glints) in the first image according to the matching result. A specific method is shown in FIG. 3.

Figure 3:
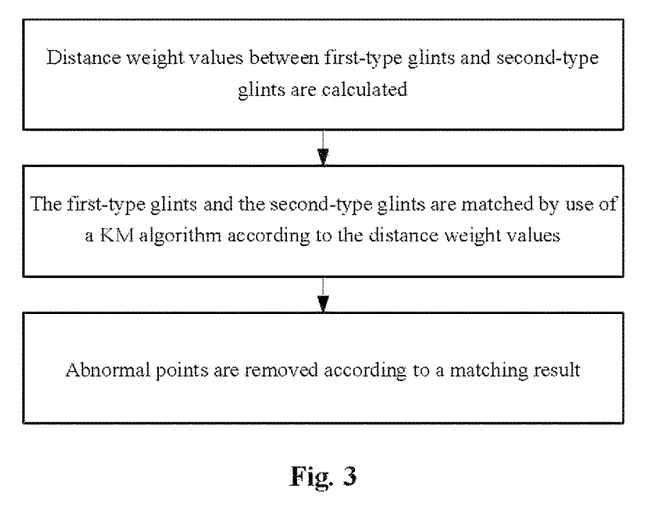
FIG. 3 is a flowchart of a method for filtering glints according to an optional embodiment of the present disclosure.

Specifically, FIG. 3 is a flowchart of a method for filtering glints according to an optional embodiment of the present disclosure. As shown in FIG. 3, it can be seen that, after the positions of the second-type glints are acquired and determined, the eye-tracking device calculates the distance weight value between each glint in the first-type glints and each glint in the second-type glints at first, then matches the first-type glints and the second-type glints by use of the KM algorithm according to the obtained distance weight values, and finally removes the abnormal glints not meeting a condition according to the matching result.

In an optional embodiment, the operation that the matching result of the first-type glints and the second-type glints is determined according to the first positions of the first-type glints and the second positions of the second-type glints specifically includes the following steps.

At step S1060, distance weight values between the first-type glints and the second-type glints are determined according to the first positions of the first-type glints and the second positions of the second-type glints.

At step S1062, the first-type glints and the second-type glints are matched to obtain the matching result according to the distance weight values.

Specifically, a distance weight value Y between the first-type glints and the second-type glints may be determined according to the distance weight value $C_{ii'}$ between each glint in the first-type glints and each glint in the second-type glint specifically through the following formula:

$$c_{ii'} = e^{-\gamma(\|V(G_i) - V(G_{i'})\|)^2}.$$

In the formula, $\gamma$ is the distance weight value between the first-type glints and the second-type glints, a value of $\gamma$ may be 1, $c_{ii'}$ is the distance weight value between each glint in the first-type glints and each glint in the second-type glints, $V(G_i)$ is a position coordinate of an ith first-type glint, and $V(G_{i'})$ is a position coordinate of an i'th second-type glint.

From the formula, when a distance between the ith first-type glint and the i'th second-type glint exceeds a distance threshold value, a weight value of $c_{ii'}$ is 0. That is, when the distance between the ith first-type glint and the i'th second-type glint is infinitely long, each weight value is approximate to 0, namely the following formula is true:

$$c_{ii'} = \begin{cases} e^{-\gamma\left(\frac{\|V(G_i)-V(G_{i'})\|}{\sigma}\right)2}, \|V(G_i)-V(G_{i'})\|<\sigma \\ 0, \|V(G_i)-V(G_{i'})\| \geq \sigma \end{cases},$$

and $\sigma$ in the formula is the distance threshold value.

It is to be noted that, under a practical condition, if the distance weight values obtained by the abovementioned method are applied to the KM algorithm, matching degrees of the first-type glints and the second-type glints obtained by the KM algorithm are relatively low, so that the distance weight value $\gamma$ between the first-type glints and the second-type glints is corrected by use of an Expectation Maximization (EM) algorithm in the present disclosure to obtain the corrected distance weight value $\gamma^*$, and a specific formulae are as follows:

$$q_{ii'} = \frac{e^{-\gamma^*\left(\frac{\|V(G_i)-V(G_{i'})\|}{\sigma}\right)2} y_{ii'} Y_{i'}}{\sum_{k \in I'} e^{-\gamma^*\left(\frac{\|V(G_i)-V(G_k)\|}{\sigma}\right)2} y_{ik} Y_{i'}},$$

$$\gamma^* = \frac{\sum_{i \in I} \sum_{i' \in I'} \frac{q_{ii'} \sigma^2}{\|V(G_i)-V(G_{i'})\|^2}}{n * \sum_{i \in I} \sum_{i' \in I'} q_{ii'}},$$

$$Y_{i'} = \frac{\sum_{k \in i'} e^{-\gamma^*\left(\frac{\|V(G_k)-V(G_{i'})\|}{\sigma}\right)2} q_{ii'}}{\sum_{k \in I} e^{-\gamma^*\left(\frac{\|V(G_k)-V(G_{i'})\|}{\sigma}\right)2}},$$

and $$y_{ii'} = q_{ii'},$$

and $V(G_i)$ is the first position of the ith first-type glint $G_i$, $V(G_{i'})$ is the second position of the i'th second-type glint $G_{i'}$, $\sigma$ is the distance threshold value, $\gamma^*$ is the distance weight value between the first-type glints and the second-type glints, $q_{ii'}$ is the distance weight value between the ith first-type glint and the i'th second-type glint, I is a set of the first-type glints, I' is a set of the second-type glints, and $Y_{i'}$ is a position weight value of the i'th second-type glint.

In an optional embodiment, after the operation that the distance weight values between the first-type glints and the second-type glints are determined, the first-type glints and the second-type glints may be matched according to the KM algorithm. Herein, the KM algorithm includes the following steps.

At step one, a value of a feasible vertex labeling is initialized.

At step two, equivalent sub-graphs are searched for perfect matches.

At step three, if no perfect match is found, the value of the feasible vertex labeling is modified.

At step four, step two and step three are repeated until positions of the perfect matches in all the equivalent sub-graphs are found.

The KM algorithm may be applied to the present disclosure to obtain best matches between the first-type glints and the second-type glints. That is, the first-type glints and the second-type glints are matched to obtain the matching result according to the distance weight values, and a specific method includes the following steps.

At step S1080, a matching combination of the first-type glints and the second-type glints is determined, and the matching combination includes multiple corresponding relationships between the first-type glints and the second-type glints.

At step S1082, a weight sum of the distance weight values between each first-type glint and each second-type glint in each corresponding relationship is calculated.

At step S1084, a corresponding relationship corresponding to a maximum weight sum in the multiple corresponding relationships is determined, and the corresponding relationship corresponding to the maximum weight sum represents that the first-type glints are matched with the second-type glints.

In an optional embodiment, the first-type glints include the five glints A, B, C, D and E. And there exist the following three matching combinations with the second-type glints corresponding to the first-type glints:

at one, a first combination: A', B', C', D' and E';
at two, a second combination: A', B', F', D' and E'; and
at three, a third combination: A', B', C', G' and E'.

Descriptions will be made by taking the first combination as an example. A weight value between the glints A and A' is $a_1$, a weight value between the glints B and B' is $b_1$, a weight value between the glints C and C' is $c_1$, a weight value between the glints D and D' is $d_1$, and a weight value between the glints E and E' is $e_1$. A weight sum corresponding to the first combination is $L_1 = \alpha_1 a_1 + \beta_1 b_1 + \gamma_1 c_1 + \mu_1 d_1 + \varepsilon_1 d_1$, and $\alpha_1$, $\beta_1$, $\gamma_1$, $\mu_1$ and $\varepsilon_1$ are weighting coefficients. Similarly, a weight sum $L_2$ corresponding to the second combination and a weight sum $L_3$ corresponding to the third combination may be obtained. If a magnitude relationship among the weight sums corresponding to the three combinations are:

$$L_2 > L_3 > L_1,$$

since the weight sum corresponding to the second combination is largest, the glints corresponding to the second combination are selected as the second-type glints matched with the first-type glints. That is, the glints A', B', F', D' and E' are selected as the second-type glints matched with the first-type glints A, B, C, D and E.

It is to be noted that, the first-type glints corresponding to each glint in the second-type glints may be found through this process to complete matching of the first-type glints and the second-type glints. After matching of the first-type glints and the second-type glints is completed, the first-type glints may be filtered according to the matching result. A specific method is as follows.

At step S1102, the first-type glints are divided into a first glint and at least one second glint, and a first vector group formed by the first glint and each glint in the at least one second glint is acquired.

At step S1104, the second-type glints are divided into a third glint and at least one fourth glint, and a second vector group formed by the third glint and each glint in the at least one fourth glint is acquired.

At step S1106, a vector angle between each vector in the first vector group and a corresponding vector in the second vector group is calculated.

At step S1108, whether or not the first glint is the abnormal glint is determined according to the vector angles, and a filtering processing is performed on the abnormal glint under the condition that the first glint is the abnormal glint.

Herein, the operation that whether the first glint is the abnormal glint is determined according to the vector angles at step S1108 includes the following steps.

At step S1108a, whether or not the vector angle between each vector in the first vector group and the corresponding vector in the second vector group is larger than a preset vector angle is determined.

At step S1108b, under the condition that the vector angle is larger than the preset vector angle, and the vector angle is determined to be an abnormal vector angle.

At step S1108c, the number of the abnormal vector angles is determined.

At step S1108d, under the condition that the number of the abnormal vector angles is larger than a preset number, and the first glint is determined to be the abnormal glint.

Figure 4:
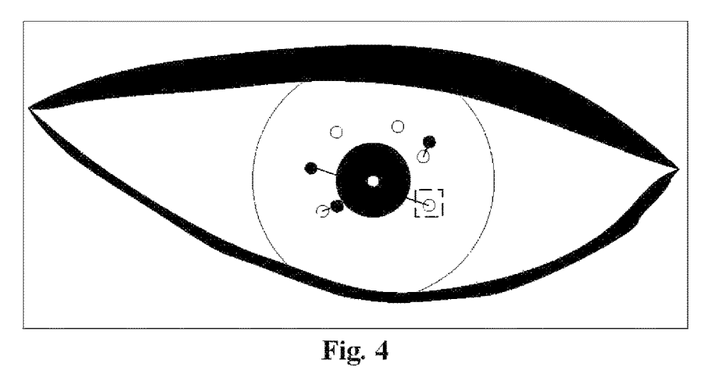
FIG. 4 is a schematic diagram of matching first-type glints and second-type glints according to an optional embodiment of the present disclosure.

In an optional embodiment, the second-type glints, matched with the first-type glints A, B, C and D, are A', B', C' and D'. At first, A is determined as the first glint, B, C and D are determined as the second glints. A' is the third glint, and B', C' and D' are the fourth glints. Then, the first vector group includes $\overline{AB}$, $\overline{AC}$ and $\overline{AD}$, and the corresponding second vector group includes $\overline{A'B'}$, $\overline{A'C'}$ and $\overline{A'D'}$. A vector angle between $\overline{AB}$ and $\overline{A'B'}$ is $\theta_1$, a vector angle between $\overline{AC}$ and $\overline{A'D'}$ is $\theta_2$, and a vector angle between $\overline{AD}$ and $\overline{A'D'}$ is $\theta_3$. After the first vector group and the second vector group are obtained, the vector angle between each vector in the first vector group and the corresponding vector in the second vector group is compared with the preset vector angle $\theta$ to obtain a magnitude relationship. For example, if $\theta_1>\theta$, $\theta_2<\theta$ and $\theta_3<\theta$, the number of the abnormal vector angles is 1 when A is the first glint. Similarly, according to this method, the numbers of the abnormal vector angles are calculated when B, C and D are the first glint respectively. For example, the numbers of the abnormal vector angles when B, C and D are the glint are 3, 2 and 0 respectively. Under the condition that the preset number is 2, since the number of the abnormal vector angles is larger than 2 when B is the first glint, B is determined to be the abnormal glint, and is filtered. As shown in FIG. 4, black solid dots represent the second-type glints, white dots represent the first-type glints, and the white dot marked by the dashed box is the abnormal glint.

Embodiment Two

Figure 5:
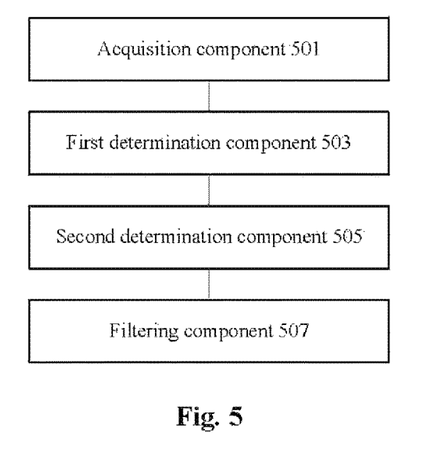
FIG. 5 is a structural schematic diagram of an apparatus for filtering glints according to an embodiment of the present disclosure.

In another embodiment of the present disclosure, an apparatus for filtering glints is also provided. FIG. 5 is a structural schematic diagram of an apparatus for filtering glints according to an embodiment of the present disclosure. As shown in FIG. 5, the apparatus includes an acquisition component 501, a first determination component 503, a second determination component 505 and a filtering component 507.

The acquisition component 501 is configured to acquire a first image and a reference image matched with the first image, and first-type glints are displayed in the first image. The first determination component 503 is configured to determine second-type glints in the first image according to the reference image, and the second-type glints are glints obtained by estimating glints in the first image on the basis of the reference image. The second determination component 505 is configured to determine a matching result of the first-type glints and the second-type glints according to first positions of the first-type glints and second positions of the second-type glints. The filtering component 507 is configured to filter the first-type glints according to the matching result.

It is to be noted that the acquisition component 501, the first determination component 503, the second determination component 505 and the filtering component 507 correspond to step S102 to step S108 in embodiment one and the four components implement an example and application scenario the same as those implemented by the corresponding steps but are not limited to the contents disclosed in embodiment one.

In an optional embodiment, the first-type glints include glints corresponding to at least one light source and false glints, and the second-type glints include the glints corresponding to the at least one light source.

In an optional embodiment, the acquisition component includes a construction component, an input component, a third determination component and a fourth determination component. The construction component is configured to construct a bilinear model. The input component is configured to input the first image into the bilinear model. The third determination component is configured to determine output data of the bilinear model. And the fourth determination component is configured to determine the reference image according to the output data.

It is to be noted that the construction component, the input component, the third determination component and the fourth determination component correspond to step S1022 to step S1028 in embodiment one and the four components implement an example and application scenario the same as those implemented by the corresponding steps but are not limited to the contents disclosed in embodiment one.

In an optional embodiment, the construction component includes a collection component, a first acquisition component and a processing component. The collection component is configured to collect multiple images, and each image in the multiple images includes the glints corresponding to the at least one light source. The first acquisition component is configured to acquire parameter information of each image, and the parameter information includes at least one of starting positions of the glints in each image and a shooting viewing angle of each image. And the processing component is configured to obtain the bilinear model according to the parameter information of each image and relative positions of the glints and pupil in each image.

It is to be noted that the collection component, the first acquisition component and the processing component correspond to step S1022a to step S1022c in embodiment one and the three components implement an example and application scenario the same as those implemented by the corresponding steps but are not limited to the contents disclosed in embodiment one.

In an optional embodiment, the first determination component includes a second acquisition component, a third acquisition component and a fifth determination component. The second acquisition component is configured to acquire a relative position of each glint and the pupil in the reference image. The third acquisition component is configured to acquire a position of the pupil in the first image. And the fifth determination component is configured to determine the positions of the second-type glints according to the position of the pupil in the first image and the relative position of each glint and the pupil in the reference image.

It is to be noted that the second acquisition component, the third acquisition component and the fifth determination component correspond to step S1040 to step S1044 in embodiment one and the three components implement an example and application scenario the same as those implemented by the corresponding steps but are not limited to the contents disclosed in embodiment one.

In an optional embodiment, the second determination component includes a sixth determination component and a matching component. The sixth determination component is configured to determine distance weight values between the first-type glints and the second-type glints according to the first positions of the first-type glints and the second positions of the second-type glints. And the matching component is configured to match the first-type glints and the second-type glints to obtain the matching result according to the distance weight values.

It is to be noted that the sixth determination component and the matching component correspond to step S1060 to step S1062 in embodiment one and the two components implement an example and application scenario the same as those implemented by the corresponding steps but are not limited to the contents disclosed in embodiment one.

In an optional embodiment, the matching component includes a seventh determination component, a first calculation component and an eighth determination component. The seventh determination component is configured to determine a matching combination of the first-type glints and the second-type glints, and the matching combination includes multiple corresponding relationships between the first-type glints and the second-type glints. The first calculation component is configured to calculate a weight sum of the distance weight values between each first-type glint and each second-type glint in each corresponding relationship. And the eighth determination component is configured to determine a corresponding relationship corresponding to a maximum weight sum in the multiple corresponding relationships, and the corresponding relationship corresponding to the maximum weight sum represents that the first-type glints are matched with the second-type glints.

It is to be noted that the seventh determination component, the first calculation component and the eighth determination component correspond to step S1080 to step S1084 in embodiment one and the three components implement an example and application scenario the same as those implemented by the corresponding steps but are not limited to the contents disclosed in embodiment one.

In an optional embodiment, the filtering component includes a fourth acquisition component, a fifth acquisition component, a second calculation component and a ninth determination component. The fourth acquisition component is configured to divide the first-type glints into a first glint and at least one second glint and acquire a first vector group formed by the first glint and each glint in the at least one second glint. The fifth acquisition component is configured to divide the second-type glints into a third glint and at least one fourth glint and acquire a second vector group formed by the third glint and each glint in the at least one fourth glint. The second calculation component is configured to calculate a vector angle between each vector in the first vector group and a corresponding vector in the second vector group. And the ninth determination component is configured to determine whether or not the first glint is an abnormal glint according to the vector angles and perform filtering processing on the abnormal glint under the condition that the first glint is the abnormal glint.

It is to be noted that the fourth acquisition component, the fifth acquisition component, the second calculation component and the ninth determination component correspond to step S1102 to step S1108 in embodiment one and the four components implement an example and application scenario the same as those implemented by the corresponding steps but are not limited to the contents disclosed in embodiment one.

In an optional embodiment, the eighth determination component includes a tenth determination component, an eleventh determination component, a twelfth determination component and a thirteenth determination component. The tenth determination component is configured to determine whether or not the vector angle between each vector in the first vector group and the corresponding vector in the second vector group is larger than a preset vector angle. The eleventh determination component is configured to, under the condition that the vector angle is larger than the preset vector angle, determine the vector angle to be an abnormal vector angle. The twelfth determination component is configured to determine the number of the abnormal vector angles. And the thirteenth determination component is configured to, under the condition that the number of the abnormal vector angles is larger than a preset number, determine the first glint to be the abnormal glint.

It is to be noted that the tenth determination component, the eleventh determination component, the twelfth determination component and the thirteenth determination component correspond to step S1108a to step S1108d in embodiment one and the four components implement an example and application scenario the same as those implemented by the corresponding steps but are not limited to the contents disclosed in embodiment one.

Embodiment Three

In another embodiment of the present disclosure, a storage medium is also provided, which includes a stored program, the stored program executing the method for filtering glints in embodiment one.

Each functional component provided in the embodiment of the present disclosure may run in the apparatus for filtering glints or a similar arithmetic apparatus, and may also be stored as a part of the storage medium.

Optionally, in the embodiment, a computer program is stored in the storage medium, and the computer program is configured to run to execute the method for filtering glints.

Optionally, in the embodiment, the storage medium is configured to store a program code configured to execute the following steps: acquiring a first image and a reference image matched with the first image, and first-type glints are displayed in the first image; determining second-type glints in the first image according to the reference image, and the second-type glints are glints obtained by estimating glints in the first image on the basis of the reference image; determining a matching result of the first-type glints and the second-type glints according to first positions of the first-type glints and second positions of the second-type glints; and filtering the first-type glints according to the matching result.

Optionally, in the embodiment, the storage medium may further be configured to store a program code for each preferred or optional method step provided in the method for filtering glints.

Embodiment Four

In another embodiment of the present disclosure, a processor is also provided, which is configured to run a program, the program running to execute the method for filtering glints in embodiment one.

In the embodiment of the present disclosure, the processor may execute the running program for the method for filtering glints.

Optionally, in the embodiment, the processor may be configured to execute the following steps: acquiring a first image and a reference image matched with the first image, and first-type glints are displayed in the first image; determining second-type glints in the first image according to the reference image, and the second-type glints are glints obtained by estimating glints in the first image on the basis of the reference image; determining a matching result of the first-type glints and the second-type glints according to first positions of the first-type glints and second positions of the second-type glints; and filtering the first-type glints according to the matching result.

The processor may run a software program and component stored in a memory, thereby executing various functional applications and data processing, namely implementing the method for filtering glints.

Those of ordinary skill in the art can understand that all or part of the steps in each method in the abovementioned embodiment may be completed by hardware indicated through the program and related to a pupil position determination device, the program may be stored in a storage medium readable for the pupil position determination device, and the storage medium may include a flash disk, a Read-Only Memory (ROM), a Random Access Memory (RAM), a magnetic disk, an optical disk or the like.

The method and apparatus for filtering glints are exemplarily described above with reference to the drawings. However, those skilled in the art should know that various improvements may further be made to the method and apparatus for filtering glints disclosed in the present disclosure without departing from the contents of the present disclosure. Therefore, the scope of protection of the present disclosure should be determined by the contents of the appended claims.

Embodiment Five

In another embodiment of the present disclosure, an eye-tracking apparatus is also provided, which includes the apparatus for filtering glints in embodiment two.

The sequence numbers of the embodiments of the present disclosure are adopted for description and do not represent superiority-inferiority of the embodiments.

In the embodiments of the present disclosure, the descriptions of the embodiments focus on different aspects. The part which is not described in a certain embodiment in detail may refer to the related description of the other embodiments.

In some embodiments provided in the present disclosure, it should be understood that the disclosed technical contents may be implemented in other manners. Herein, the apparatus embodiment described above is schematic. For example, division of the elements is division of logical functions, and other division manners may be adopted during practical implementation. For example, multiple elements or components may be combined or integrated to another system, or some features may be ignored or are not executed. In addition, shown or discussed coupling, direct coupling or communication connection may be implemented through indirect coupling or communication connection of some interfaces, elements or components, and may be in an electrical form or other forms.

The elements described as separate parts may or may not be separate physically, and parts displayed as elements may or may not be physical elements, that is, they may be located in the same place, or may also be distributed to multiple elements. Part or all of the elements may be selected to achieve the purpose of the solutions of the embodiments according to a practical requirement.

In addition, each functional element in each embodiment of the present disclosure may be integrated into a processing element, each element may also physically exist independently, and two or more than two elements may also be integrated into a element. The integrated element may be implemented in a hardware form and may also be implemented in form of software functional element.

If being implemented in form of software functional element and sold or used as an independent product, the integrated element may be stored in a computer-readable storage medium. Based on such an understanding, the technical solutions of the present disclosure substantially or parts making contributions to the related art or all or part of the technical solutions may be embodied in form of software product. The computer software product is stored in a storage medium, including a plurality of instructions configured to enable a computer device (which may be a personal computer, a server, a network device or the like) to execute all or part of the steps of the method in each embodiment of the present disclosure. The storage medium includes various media capable of storing program codes such as a U disk, a ROM, a RAM, a mobile hard disk, a magnetic disk or an optical disk.

The above are the exemplary embodiments of the present disclosure. It is to be pointed out that those of ordinary skill in the art may also make a number of improvements and embellishments without departing from the principle of the present disclosure and these improvements and embellishments shall also fall within the scope of protection of the present disclosure.

INDUSTRIAL APPLICABILITY

The solutions provided in the embodiments of the present disclosure may be applied to eye-tracking. False glints are filtered in an image matching manner, the technical problem of incapability in accurately filtering the false glints in the related art is solved, the false glints are accurately filtered, and matching accuracy of at least one light source and glints is improved.

What is claimed is:

1. A method for filtering glints, comprising: acquiring a first image and a reference image matched with the first image, wherein first-type glints are displayed in the first image; determining second-type glints in the first image according to the reference image, wherein the second-type glints are glints obtained by estimating glints in the first image on the basis of the reference image; determining a matching result of the first-type glints and the second-type glints according to first positions of the first-type glints and second positions of the second-type glints; and filtering the first-type glints according to the matching result.

2. The method as claimed in claim 1, wherein determining the second-type glints in the first image according to the reference image comprises:
acquiring a relative position of each glint and pupil in the reference image;
acquiring a position of the pupil in the first image; and
determining the positions of the second-type glints according to the position of the pupil in the first image and the relative position of each glint and the pupil in the reference image.

3. A non-transitory storage medium, comprising a stored program, the stored program executing the method for filtering glints as claimed in claim 1.

4. The method as claimed in claim 1, wherein the first-type glints comprise glints corresponding to at least one light source and false glints, and the second-type glints comprise the glints corresponding to the at least one light source.

5. The method as claimed in claim 4, wherein acquiring the reference image matched with the first image comprises:
constructing a bilinear model;
inputting the first image into the bilinear model;
determining output data of the bilinear model; and
determining the reference image according to the output data.

6. The method as claimed in claim 5, wherein constructing the bilinear model comprises:
collecting a plurality of images, wherein each image in the plurality of images comprises the glints corresponding to the at least one light source;
acquiring parameter information of each image, wherein the parameter information comprises at least one of starting positions of the glints in each image and a shooting viewing angle of each image; and
obtaining the bilinear model according to the parameter information of each image and relative positions of the glints and pupil in each image.

7. The method as claimed in claim 1, wherein determining the matching result of the first-type glints and the second-type glints according to the first positions of the first-type glints and the second positions of the second-type glints comprises:
determining distance weight values between the first-type glints and the second-type glints according to the first positions of the first-type glints and the second positions of the second-type glints; and
matching the first-type glints and the second-type glints to obtain the matching result according to the distance weight values.

8. The method as claimed in claim 7, wherein matching the first-type glints and the second-type glints to obtain the matching result according to the distance weight values comprises:
determining a matching combination of the first-type glints and the second-type glints, wherein the matching combination comprises a plurality of corresponding relationships between the first-type glints and the second-type glints;
calculating a weight sum of the distance weight values between each first-type glint and each second-type glint in each corresponding relationship; and
determining a corresponding relationship corresponding to a maximum weight sum in the plurality of corresponding relationships, wherein the corresponding relationship corresponding to the maximum weight sum represents that the first-type glints are matched with the second-type glints.

9. The method as claimed in claim 8, wherein filtering the first-type glints according to the matching result comprises:
dividing the first-type glints into a first glint and at least one second glint, and acquiring a first vector group formed by the first glint and each glint in the at least one second glint;
dividing the second-type glints into a third glint and at least one fourth glint, and acquiring a second vector group formed by the third glint and each glint in the at least one fourth glint;
calculating a vector angle between each vector in the first vector group and a corresponding vector in the second vector group; and
determining whether or not the first glint is an abnormal glint according to vector angles, and performing filtering processing on the abnormal glint under the condition that the first glint is the abnormal glint.

10. The method as claimed in claim 9, wherein determining whether or not the first glint is the abnormal glint according to the vector angles comprises:
determining whether or not the vector angle between each vector in the first vector group and the corresponding vector in the second vector group is larger than a preset vector angle;
under the condition that the vector angle is larger than the preset vector angle, determining the vector angle to be an abnormal vector angle;
determining the number of the abnormal vector angles; and
under the condition that the number of the abnormal vector angles is larger than a preset number, determining the first glint to be the abnormal glint.

11. An apparatus for filtering glints, comprising: a hardware processor coupled with a memory and configured to execute program components stored on the memory, wherein the program components comprise: an acquisition component, configured to acquire a first image and a reference image matched with the first image, wherein first-type glints are displayed in the first image; a first determination component, configured to determine second-type glints in the first image according to the reference image, wherein the second-type glints are glints obtained by estimating glints in the first image on the basis of the reference image; a second determination component, configured to determine a matching result of the first- type glints and the second-type glints according to first positions of the first-type glints and second positions of the second-type glints; and a filtering component, configured to filter the first-type glints according to the matching result.

12. An eye-tracking device, comprising the apparatus as claimed in claim 11.

13. The apparatus as claimed in claim 11, wherein the first-type glints comprise glints corresponding to at least one light source and false glints, and the second-type glints comprise the glints corresponding to the at least one light source.

14. The apparatus as claimed in claim 13, wherein the acquisition component comprises:
a construction component, configured to construct a bilinear model;
an input component, configured to input the first image into the bilinear model;
a third determination component, configured to determine output data of the bilinear model; and
a fourth determination component, configured to determine the reference image according to the output data.

15. The apparatus as claimed in claim 14, wherein the construction component comprises:
a collection component, configured to collect a plurality of images, wherein each image in the plurality of images comprises the glints corresponding to the at least one light source;
a first acquisition component, configured to acquire parameter information of each image, wherein the parameter information comprises at least one of starting positions of the glints in each image and a shooting viewing angle of each image; and
a processing component, configured to obtain the bilinear model according to the parameter information of each image and relative positions of the glints and pupil in each image.

16. The apparatus as claimed in claim 11, wherein the first determination component comprises:
a second acquisition component, configured to acquire a relative position of each glint and the pupil in the reference image;
a third acquisition component, configured to acquire a position of the pupil in the first image; and
a fifth determination component, configured to determine the positions of the second-type glints according to the position of the pupil in the first image and the relative position of each glint and the pupil in the reference image;
or wherein the second determination component comprises:
a sixth determination component, configured to determine distance weight values between the first-type glints and the second-type glints according to the first positions of the first-type glints and the second positions of the second-type glints; and
a matching component, configured to match the first-type glints and the second-type glints to obtain the matching result according to the distance weight values.

17. The apparatus as claimed in claim 16, wherein the matching component comprises:
a seventh determination component, configured to determine a matching combination of the first-type glints and the second-type glints, wherein the matching combination comprises a plurality of corresponding relationships between the first-type glints and the second-type glints;
a first calculation component, configured to calculate a weight sum of the distance weight values between each first-type glint and each second-type glint in each corresponding relationship; and
an eighth determination component, configured to determine a corresponding relationship corresponding to a maximum weight sum in the plurality of corresponding relationships, wherein the corresponding relationship corresponding to the maximum weight sum represents that the first-type glints are matched with the second-type glints.

18. The apparatus as claimed in claim 17, wherein the filtering component comprises:
a fourth acquisition component, configured to divide the first-type glints into a first glint and at least one second glint and acquire a first vector group formed by the first glint and each glint in the at least one second glint;
a fifth acquisition component, configured to divide the second-type glints into a third glint and at least one fourth glint and acquire a second vector group formed by the third glint and each glint in the at least one fourth glint;
a second calculation component, configured to calculate a vector angle between each vector in the first vector group and a corresponding vector in the second vector group; and
a ninth determination component, configured to determine whether or not the first glint is an abnormal glint according to the vector angles and perform filtering processing on the abnormal glint under the condition that the first glint is the abnormal glint.

19. The apparatus as claimed in claim 18, wherein the eighth determination component comprises:
a tenth determination component, configured to determine whether or not the vector angle between each vector in the first vector group and the corresponding vector in the second vector group is larger than a preset vector angle;
an eleventh determination component, configured to, under the condition that the vector angle is larger than the preset vector angle, determine the vector angle to be an abnormal vector angle;
a twelfth determination component, configured to determine the number of the abnormal vector angles; and
a thirteenth determination component, configured to, under the condition that the number of the abnormal vector angles is larger than a preset number, determine the first glint to be the abnormal glint.

* * * * *